US006879074B2

(12) United States Patent
Amrhein et al.

(10) Patent No.: US 6,879,074 B2
(45) Date of Patent: Apr. 12, 2005

(54) STATOR FIELD PROVIDING TORQUE AND LEVITATION

(75) Inventors: Wolfgang Amrhein, Ottensheim (AT); Siegfried Silber, Kirchschlag (AT)

(73) Assignee: Levitronix LLC, Waltham, MA (US)

( * ) Notice: Subject to any disclaimer, the term of this patent is extended or adjusted under 35 U.S.C. 154(b) by 92 days.

(21) Appl. No.: 10/332,444

(22) PCT Filed: Jul. 12, 2001

(86) PCT No.: PCT/DE01/02530

§ 371 (c)(1),
(2), (4) Date: Jan. 7, 2003

(87) PCT Pub. No.: WO02/07289

PCT Pub. Date: Jan. 24, 2002

(65) Prior Publication Data

US 2004/0090138 A1 May 13, 2004

(30) Foreign Application Priority Data

Jul. 16, 2000 (DE) ......................... 100 34 662

(51) Int. Cl.$^7$ ................................ H02K 7/09
(52) U.S. Cl. .................................... 310/90.5
(58) Field of Search .................... 310/90.5; 417/356, 417/423.12, 423.1, 410.1

(56) References Cited

U.S. PATENT DOCUMENTS

| 4,841,204 A | * | 6/1989 | Studer ...................... 318/254 |
| 4,851,731 A |   | 7/1989 | Saotome et al. ............ 310/258 |
| 5,424,595 A | * | 6/1995 | Preston et al. ............ 310/90.1 |
| 6,100,618 A | * | 8/2000 | Schoeb et al. ............ 310/90.5 |
| 6,236,130 B1 | * | 5/2001 | Amrhein et al. ........... 310/90.5 |
| 6,268,675 B1 | * | 7/2001 | Amrhein ..................... 310/90.5 |
| 6,465,923 B2 | * | 10/2002 | Amrhein ..................... 310/90.5 |
| 6,559,567 B2 | * | 5/2003 | Schob ........................ 310/90.5 |
| 6,707,200 B2 | * | 3/2004 | Carroll et al. ............. 310/90.5 |

FOREIGN PATENT DOCUMENTS

| DE | 19726352 A1 |   | 1/1999 | ............ H02K/7/09 |
| GB | 2380618 | * | 4/2003 | ............ H02K/7/09 |
| JP | 11348457 |   | 12/1999 | ............ H02K/7/09 |
| WO | WO 98/42063 A1 |  | 9/1998 | ............ H02K/7/00 |

* cited by examiner

Primary Examiner—Karl Tamai
(74) Attorney, Agent, or Firm—Townsend and Townsend and Crew LLP

(57) ABSTRACT

The invention relates to an economical, non-wearing, electrical permanent magnet drive for actively controlling the rotor position in three degree of freedom. The stator windings produce superimposed fields with different pole numbers in the pole pitches by unsymmetrical magnetomotive force distributions.

32 Claims, 15 Drawing Sheets

US 6,879,074 B2

STATOR FIELD PROVIDING TORQUE AND LEVITATION

BACKGROUND OF THE INVENTION

The magnetic bearing technology includes fields of application of machine and apparatus construction with extremely high requirements for the rotary speed range, the working life, the cleanliness and the sealed nature of the drive system—i.e. essentially fields of application which cannot be realized or can only be realized with difficulty using conventional bearing techniques. Various embodiments, such as for example high speed milling and grinding spindles, turbo compressors, vacuum pumps or pumps for high purity chemical or medical products, are already equipped with magnetic bearings.

The machine cross-sections shown in the following figures are simply by way of example and partly greatly simplified and serve exclusively for the more precise explanation of the principle of operation.

A conventional magnetically journalled machine (FIG. 1) requires, in addition to a machine unit (1), two radial magnetic bearings (2), (3), an axial magnetic bearing (4), two mechanical touch down bearings (5), (6), as well as a total of ten power converter stages (7), (8), (9), (10) for the control of the motor phases and magnetic bearing phases.

In the literature there are proposals (FIG. 2) for the integration of machines and radial magnetic bearings into one magnetic stator unit. In one stator there are two separate winding systems (11), (12) for torque winding and levitation force winding which are inserted into slots in multiple layers. The relationship $p_1=p_2\pm2$ basically applies in bearingless motors for a largely decoupled levitation force formation and torque formation between the winding pole numbers, with $p_1$ or $p_2$ also representing the pole number of the rotor. Both winding systems of the motor in FIG. 2 are three-phase. The coils are chord-wound and distributed over several slots, whereby an approximately sinusoidal flux linkage is achieved. The two windings are composed as follows:

four-pole machine winding (11) (outer): phase 1 (13), phase 2 (14), phase 3 (15)

two-pole levitation winding (12) (inner): phase 1 (16), phase 2 (17), phase 3 (18).

In order to achieve a cost-favorable overall system the possibility exists of reducing the number of winding systems and thus to simplify the control electronics in addition to the mechanical layout.

As an example of a motor with a reduced number of windings, a motor with common torque winding systems and levitation force winding systems consisting of four concentrated coils should be explained which will be termed a bearingless single-phase motor in the following.

In FIG. 3 the rotor and stator of a four-pole motor is shown in an external rotor embodiment. In this arrangement the rotor (35) is preferably constructed in ring-shaped or bell-shaped design. With the aid of the four concentrated coils (31, 32, 33, 34) generation of a two-pole and four-pole circulation distribution is possible, so that a levitation force in the x and y directions and torque can be produced independently of one another. The determination of the individual phase currents takes place paying attention to the desired value setting for the rotor position and speed of rotation, rotor angle or torque after evaluation of the sensor signals for rotor position (x, y) and rotor angle of rotation ($\phi$).

In the preceding section in connection with the prior art the bearingless single-phase motor and the multiphase rotary field motors were described.

Both embodiments have considerable technical and economical disadvantages:

The bearingless single-phase motor (FIG. 3) is only suited for applications with low requirements with respect to the starting torque. These include, for example, drives for pumps, blowers, fans or ventilators. In the simplest constructional form the bearingless single-phase motor requires only four individual coils. The starting weakness of the single-phase drive is brought about by the design. Whereas rotary field windings are used for the building up of the radial levitation forces, the motor part only has one single-phase alternating field winding. There are thus critical angular positions of the rotor in which the starting torque is zero independently of the selected current amplitude. Provision must therefore be made design-wise for the rotor to come to rest only in positions which differ from the critical angular positions. The moment of inertia of the drive thus enables the critical points to be overcome in particular in the starting phase but also in the steady-state operation. For many other drive tasks the starting torque of this type of motor is too small.

The bearingless multiphase motor (FIG. 2) corresponding to the prior art does not have the disadvantage of low torque angular positions. In contrast to the single-phase variant it not only has its own rotary field winding in the bearing part but also in the motor part. However the high coil numbers associated with the two rotary field windings are disadvantageous here. Typical coil numbers of such bearingless motors range as a rule between 36 (distributed three-phase windings) and 12 (simple two-phase windings).

Bearingless motors, with small numbers of coils and without the restrictions of the field of application which result from the single-phase technology, would be desirable from the preceding considerations and technically and economically extremely interesting for the drive market.

SUMMARY OF THE INVENTION

The present invention solves the problems encountered in the past with a substantially simplified construction of the magnetically journalled machine and a simplified electrical control which is of particular advantage.

A further decisive advantage lies, as a result of the asymmetrical winding construction, in the pronounced chording of the winding and the associated high damping of harmonics in the field layout and circulation layout. This characteristic enlarges the stability range of the position and rotational speed controller, the accuracy of setting and also the quietness of running of the magnetically journalled drive system.

BRIEF DESCRIPTION OF THE DRAWINGS

Embodiments of the invention will be explained in the following with reference to the drawings. There are shown in schematic representation.

DESCRIPTION OF THE PREFERRED EMBODIMENTS

A possible embodiment of the invention will be described by way of example in the following.

Figure 1:
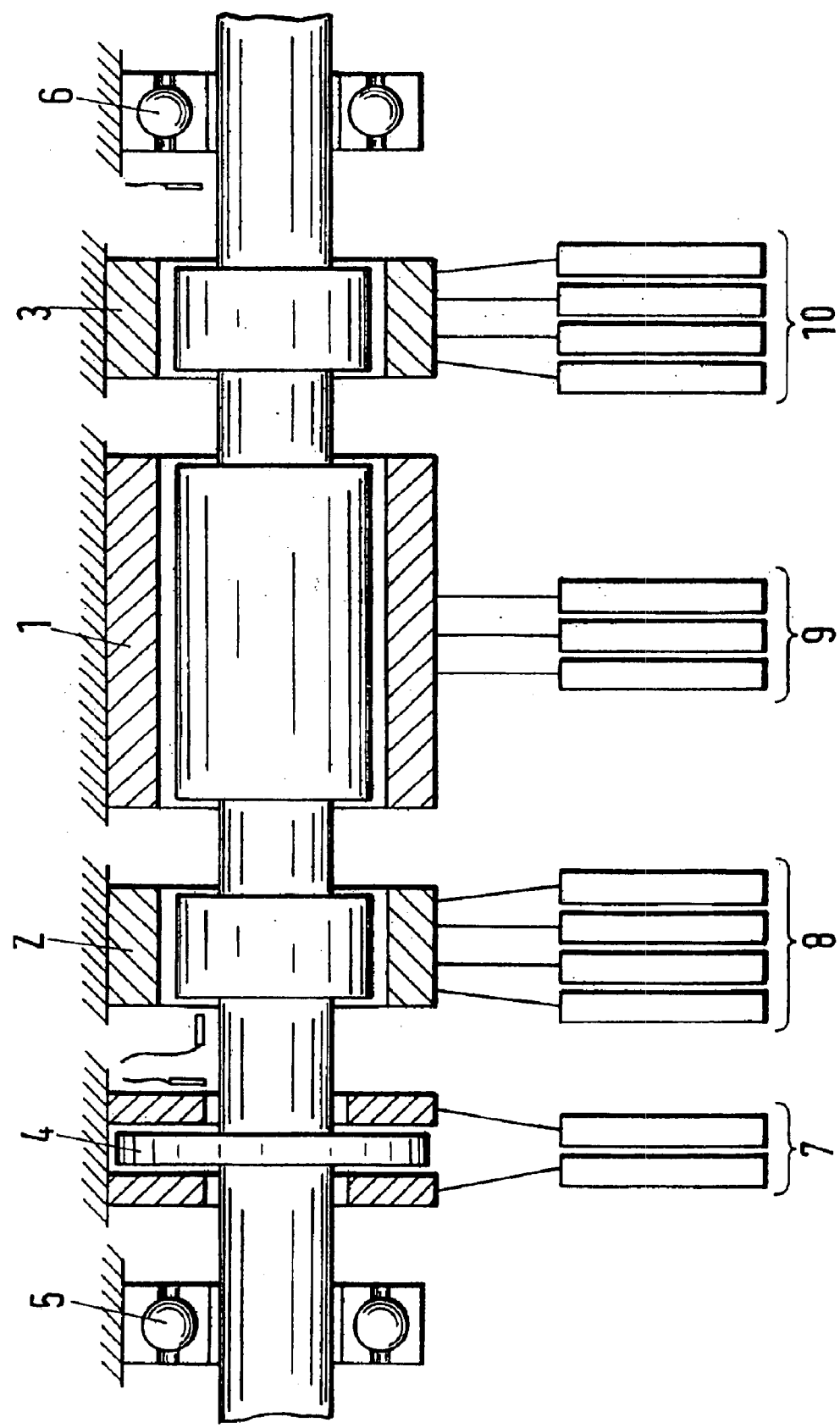
FIG. 1 shows a conventional, magnetically journalled system.
Figure 2:
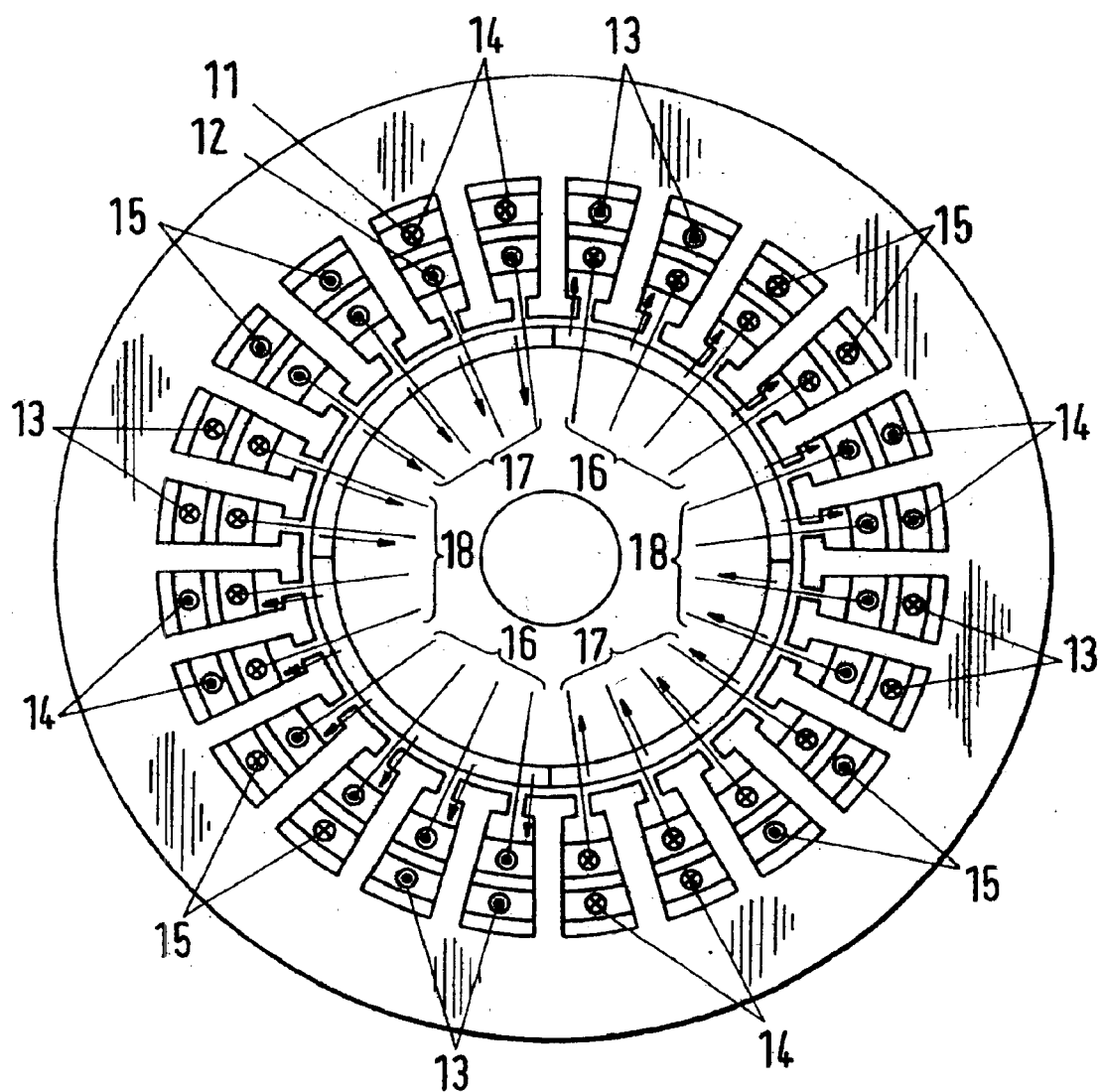
FIG. 2 shows a bearingless multiphase motor relating to the prior art.
Figure 3:
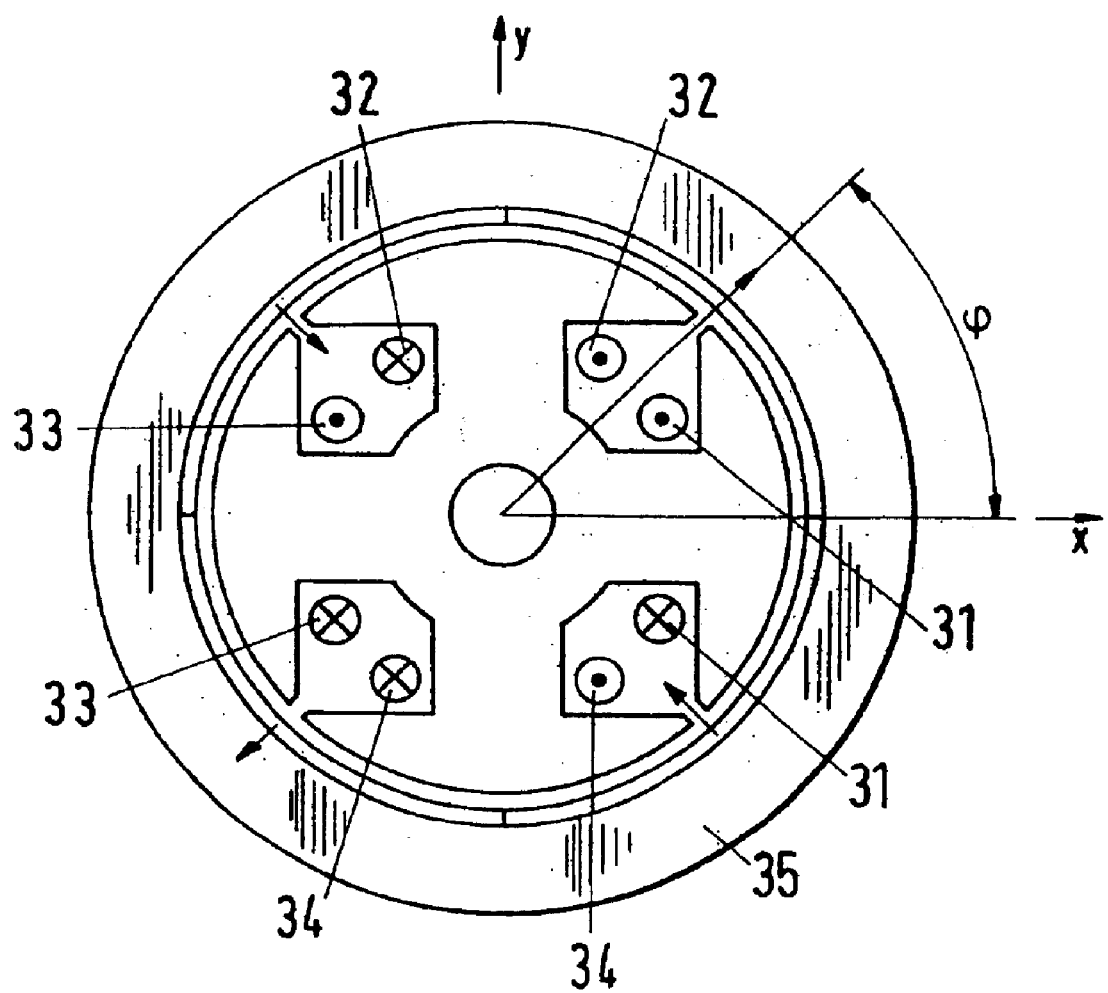
FIG. 3 shows a bearingless single-phase motor belonging to the prior art.
Figure 4:
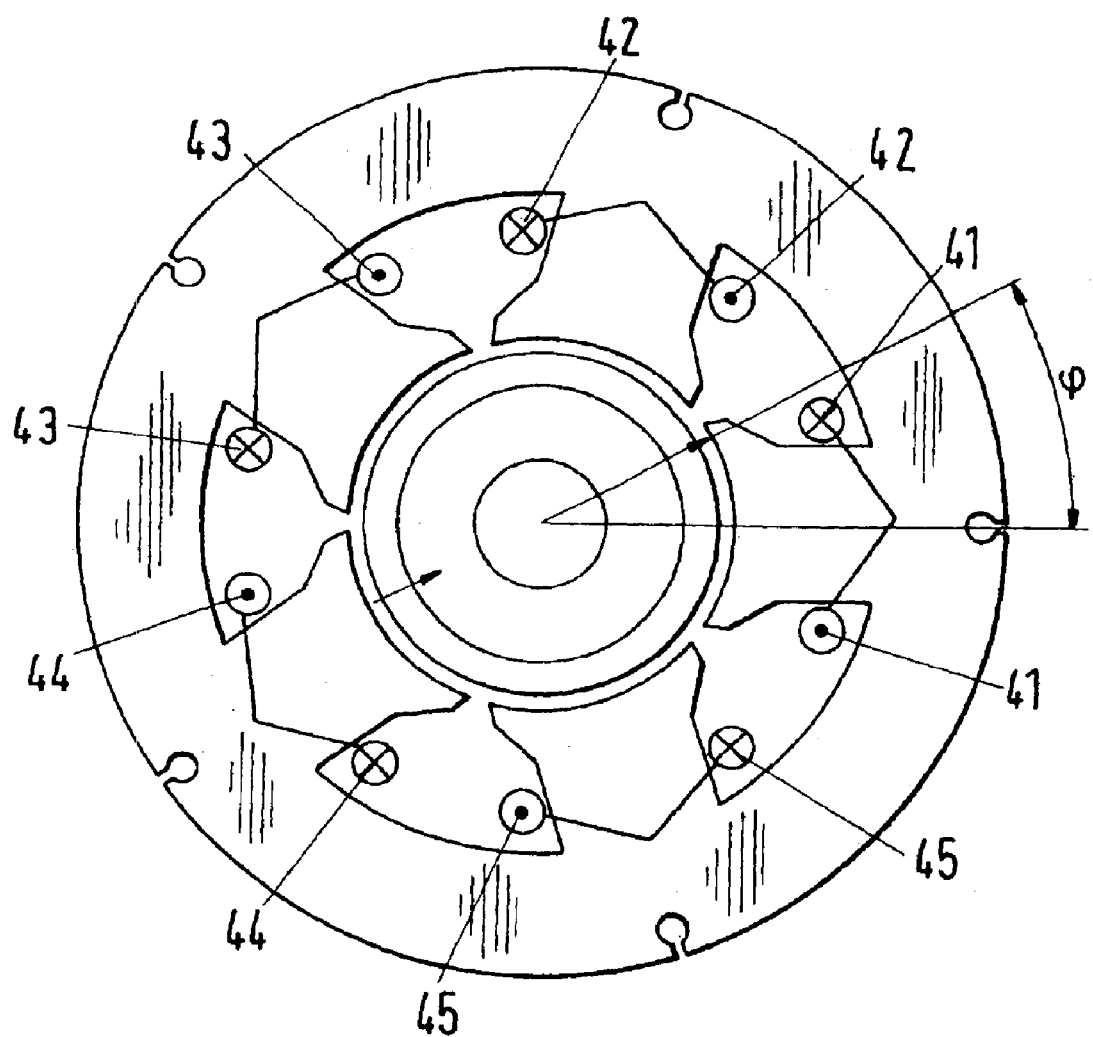
FIG. 4 shows a bearingless multiphase motor with an asymmetric stator section and concentrated windings.

FIG. 4 shows a motor with five concentrated individual coils (41, 42, 43, 44, 45). With this stator arrangement both the two-pole and also a four-pole rotary field, i.e. a two-pole and four-pole MMF, can be achieved at the same time by a corresponding supply of current to the coils with superimposed current components. Thus, in cooperation with the two-poled MMF, torque can be achieved on a two-pole rotor and radial levitation forces can be achieved in cooperation with the four-pole MMF.

The odd number of coils or limbs five, which is not whole-numbered divisible by the two-pole numbers four and two that are used, leads to an asymmetrical stator core and to asymmetrical MMF or field distributions at the periphery of the stator or of the air gap. Accordingly, in dependence on the angular position of the rotor, on the demand for levitation force and on the torque requirement, the coil currents are to be determined such that the desired operating point is achieved.

Figure 5:
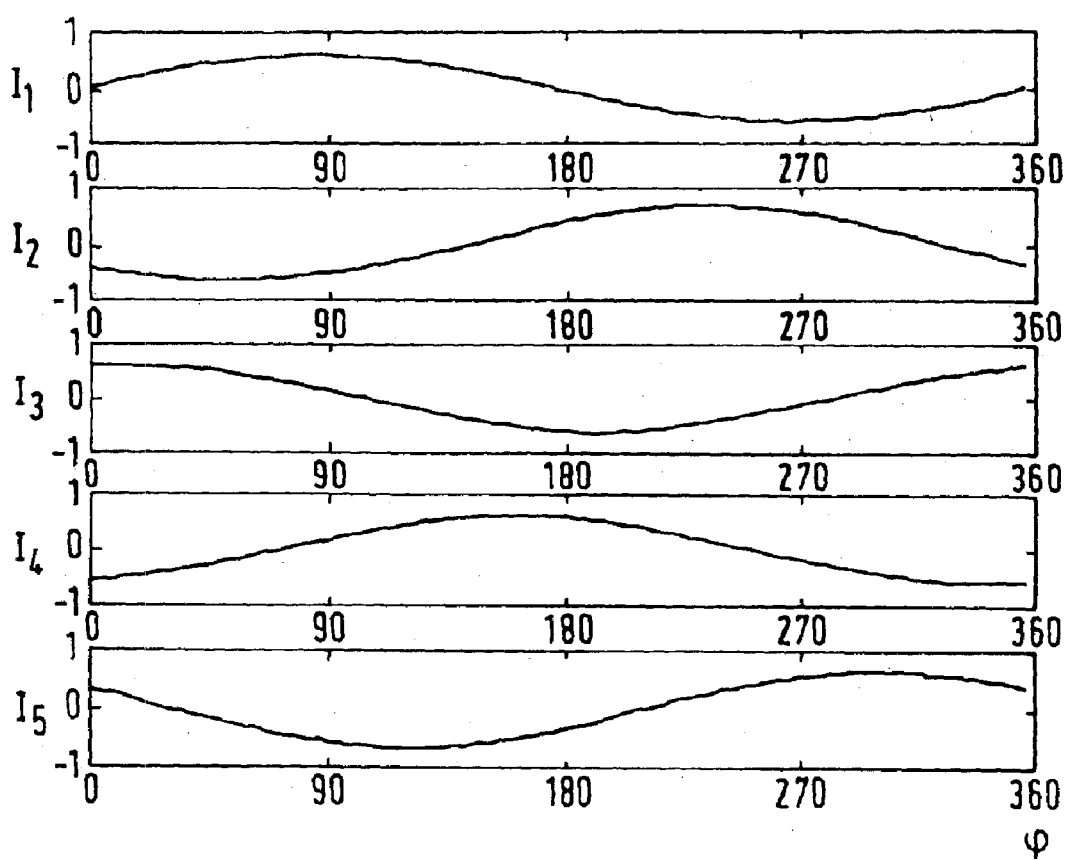
FIG. 5 shows the angle-dependent variation of the phase currents for a constant levitation force in the x direction.
Figure 6:
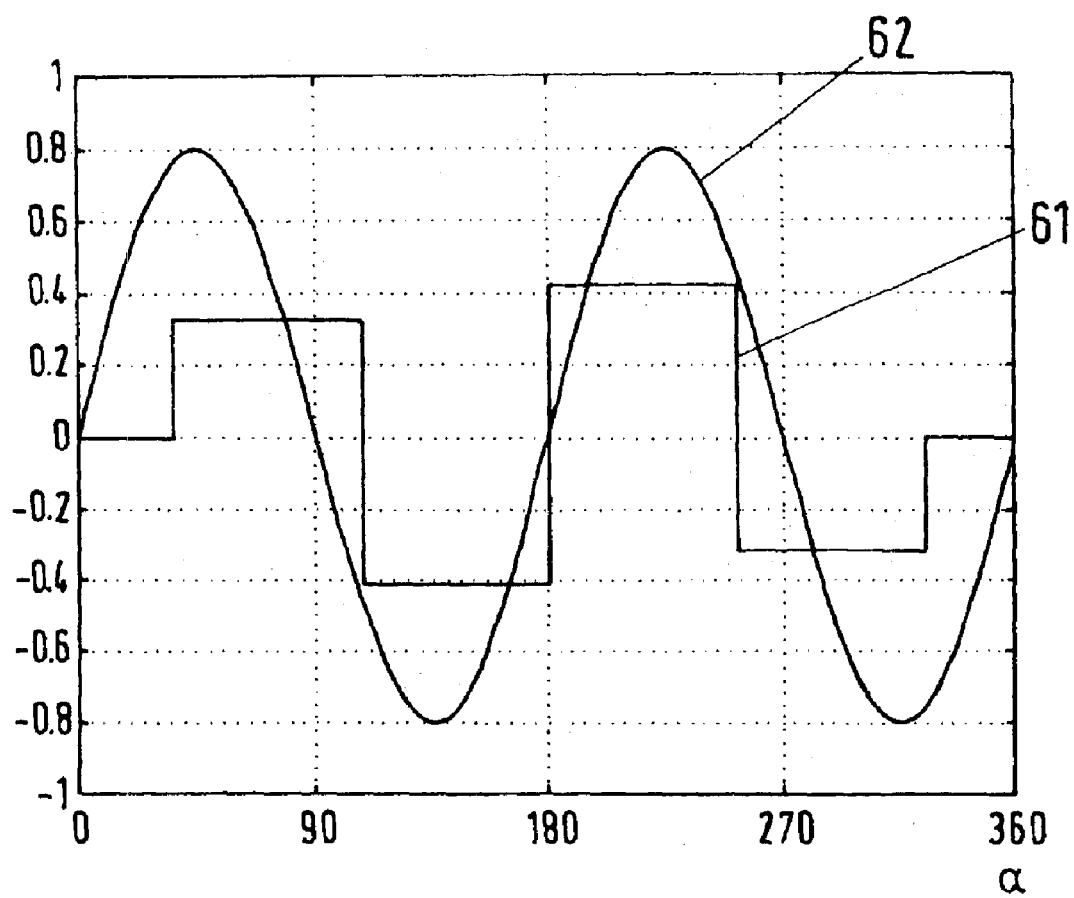
FIG. 6 shows an asymmetrical magnetomotive force (MMF) along the periphery of the stator.

FIG. 5 shows for this purpose, for a constant levitation force in the x-direction independently of the rotor angle φ of a two-pole permanent magnet rotor with sinusoidal flux density distribution, the associated levitation force coil current components, with $I_1$ designating the current through the coil 41, $I_2$ the current through the coil 42, $I_3$ the current through the coil 43, $I_4$ the current through the coil 44 and $I_5$ the current through the coil 45. In FIG. 6 the flux density plot of the winding field in the air gap 61 (with the permanent magnet field of the rotor faded out) is shown for the initial angular position (φ=0) schematically in comparison to an ideal sinusoidal four-pole flux density plot (62). The shape of a four-pole asymmetrical field can be recognized from the flux density diagram. The asymmetry arises as a consequence of the non-integer ratio of the number of limbs five to the winding pole number four realized via the phase currents.

Figure 7:
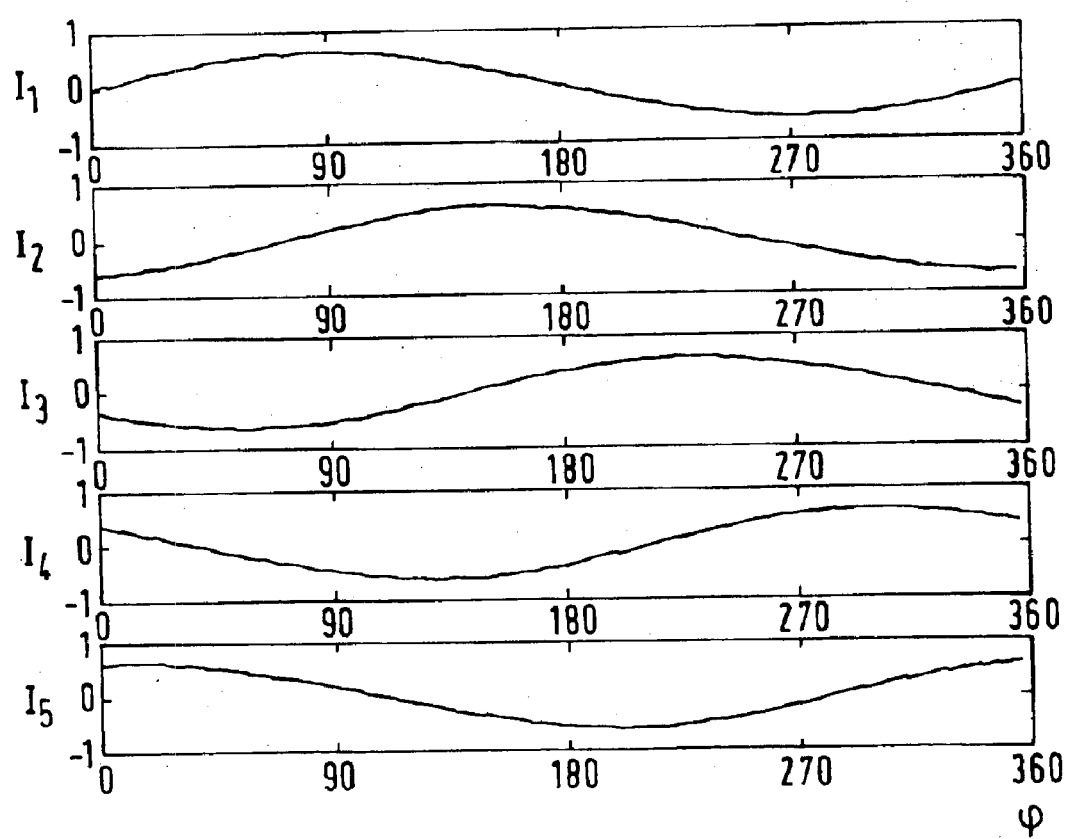
FIG. 7 shows an angle-dependent variation of the phase currents for a constant torque.

FIG. 7 shows in a manner matched to this, for a constant torque, likewise in dependence on the rotor angle φ, the associated torque coil current components, and here $I_1$ again designates the current through the coil 41, $I_2$ the current through the coil 42, $I_3$ the current through the coil 43, $I_4$ the current through the coil 44 and $I_5$ the current through the coil 45. The current components shown in the two FIGS. 5 and 7 are superimposed in the five motor coils so that both the desired torque and also the desired carrying force can be achieved.

Figure 8:
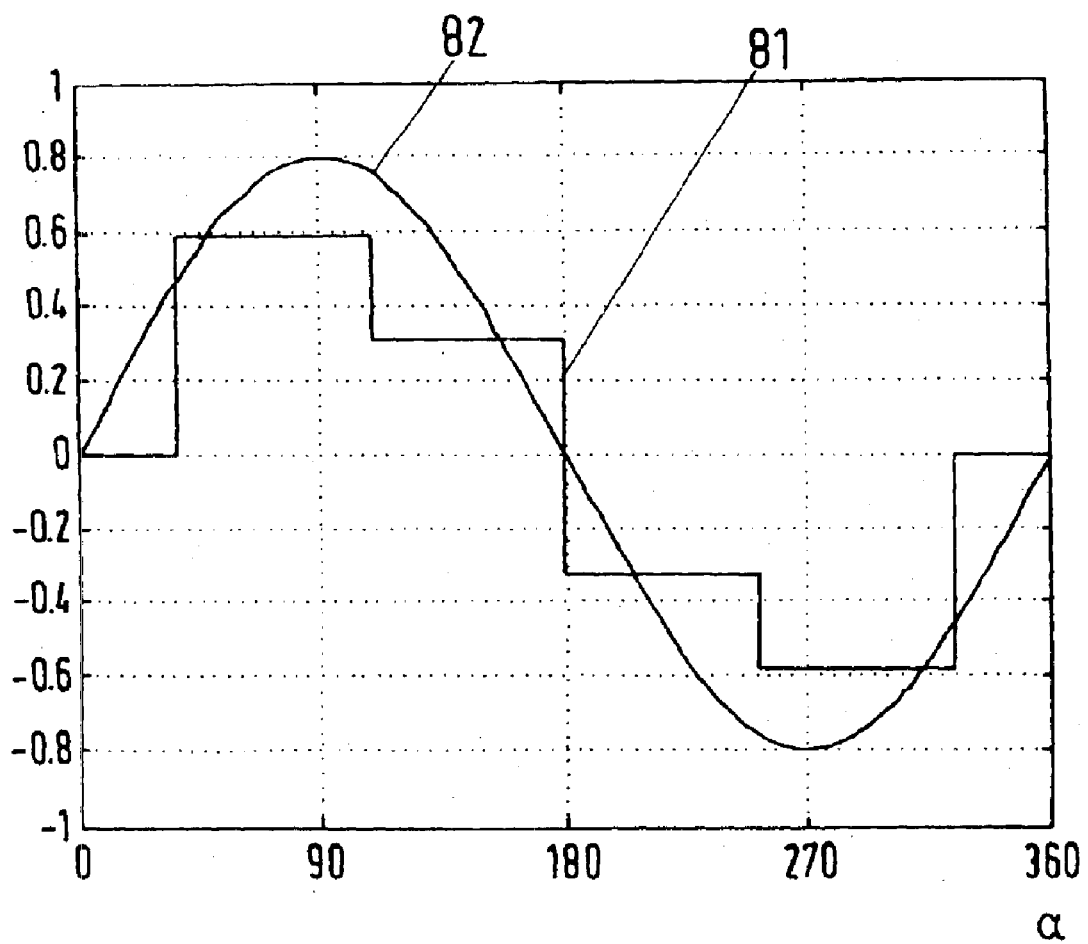
FIG. 8 shows an asymmetrical field shape at the air gap periphery with the permanent magnetic field faded out.

The total MMF of the motor over the stator periphery arises from the electrical superposition of the currents and the geometrical distribution of the coils. In FIG. 8 there is again shown the flux density plot of the winding field in the air gap (81) (likewise with the permanent magnetic field of the rotor faded out) for the initial angular position of the rotor (φ±0) in comparison to an ideal sinusoidal two-pole flux density plot (82). The shape of a two-pole asymmetrical field can be recognized from the flux density diagram. The asymmetry arises as a consequence of the non-integer ratio of the limb number five to the winding pole number two realized via the phase currents.

In the same manner bearingless rotary field motors can also be designed with for example six or seven concentrated individual coils. A three-coil solution leads to a bearingless single-phase motor with reduced mechanical cost and complexity.

Figure 9:
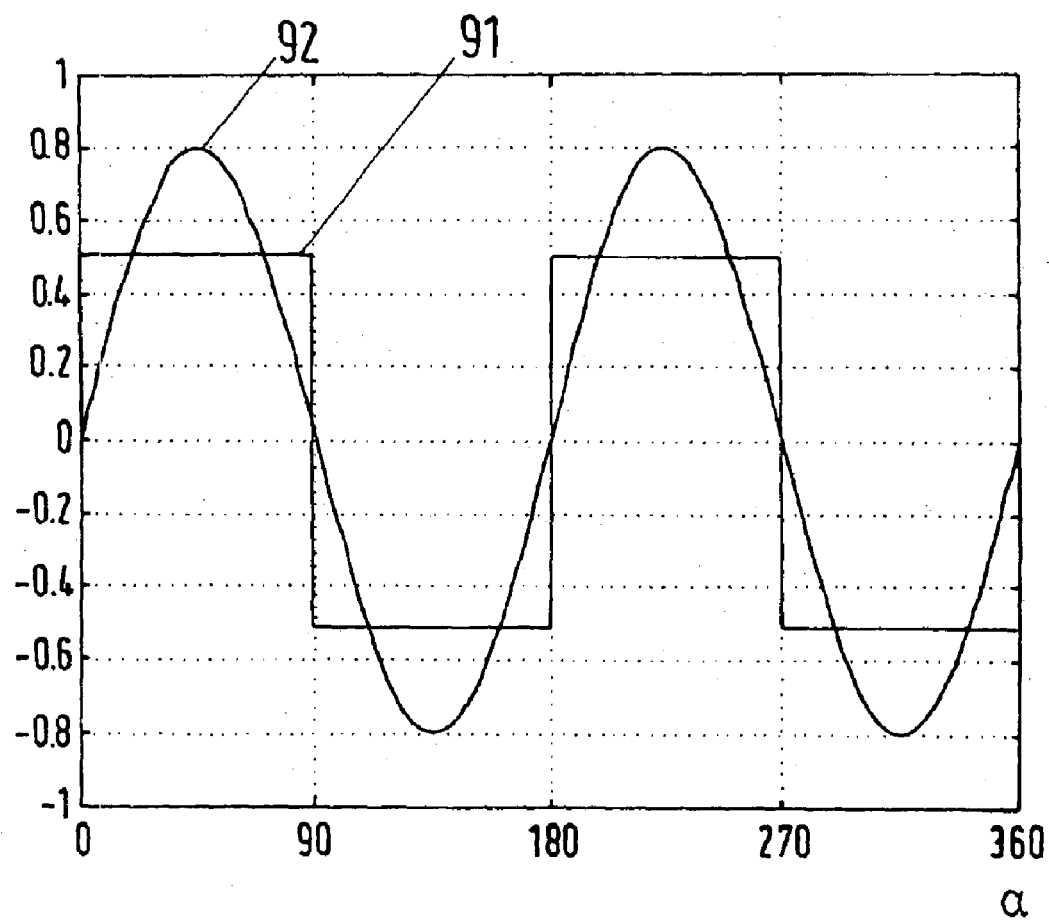
FIG. 9 shows the flux density variation of the levitation force winding (four-pole) of a motor with symmetrical stator core (rotor: two pole)
Figure 10:
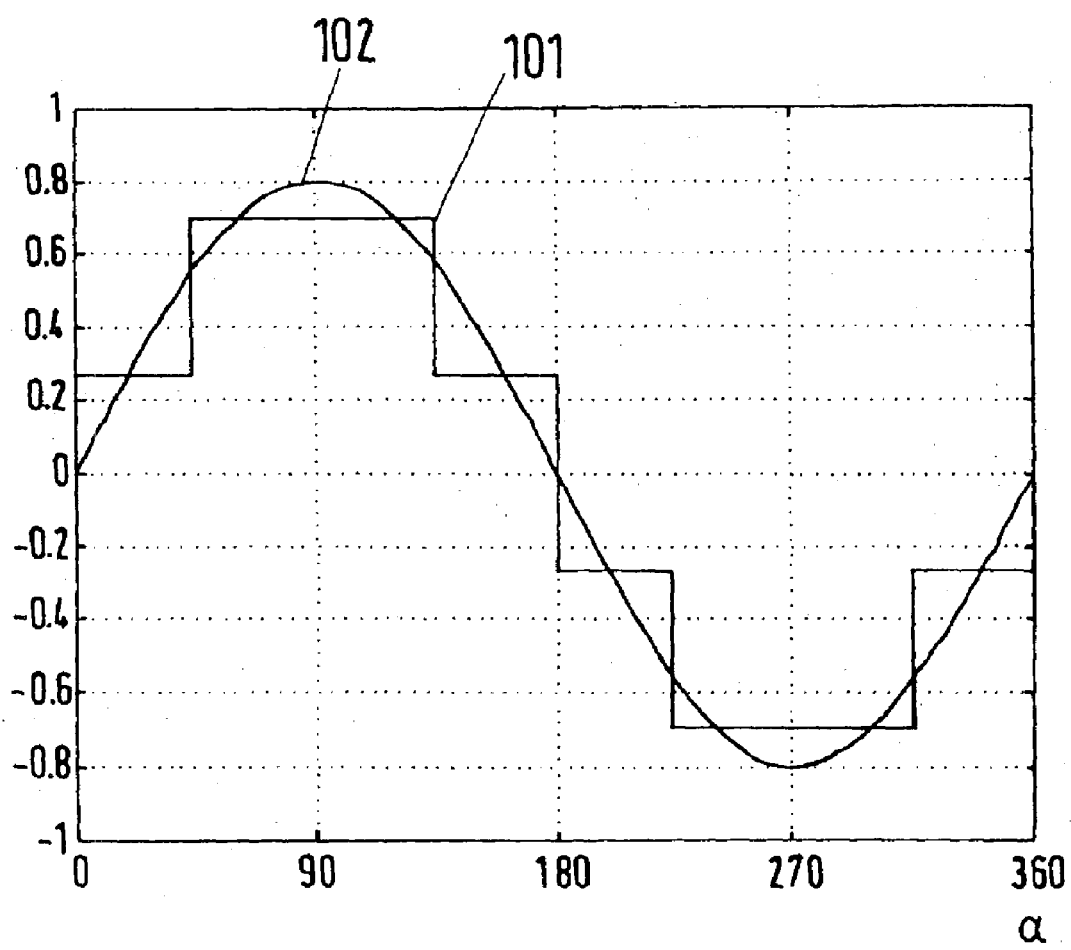
FIG. 10 shows the flux density variation of the torque winding (two pole) of a motor with a symmetrical stator core (rotor: two pole)

In order to show the difference in the flux density shape to a symmetrically designed motor, a four-pole MMF and flux density plot (91) which arises with a motor with eight concentrated individual coils is shown in FIG. 9 in comparison to an ideal sinusoidal four-pole MMF and flux density plot (92). For this motor configuration there are shown, in associated manner in FIG. 10, a two-pole MMF and flux density plot (101), again in comparison to a sinusoidal circulation and flux density plot (102).

Instead of concentrated individual windings, distributed and optionally chorded windings can be implemented into the stator. Here the tooth number or slot number of the stator is so selected for the above-named reasons that it does not amount to any whole-numbered multiple of the two winding pole numbers which are to be realized.

Figure 11:
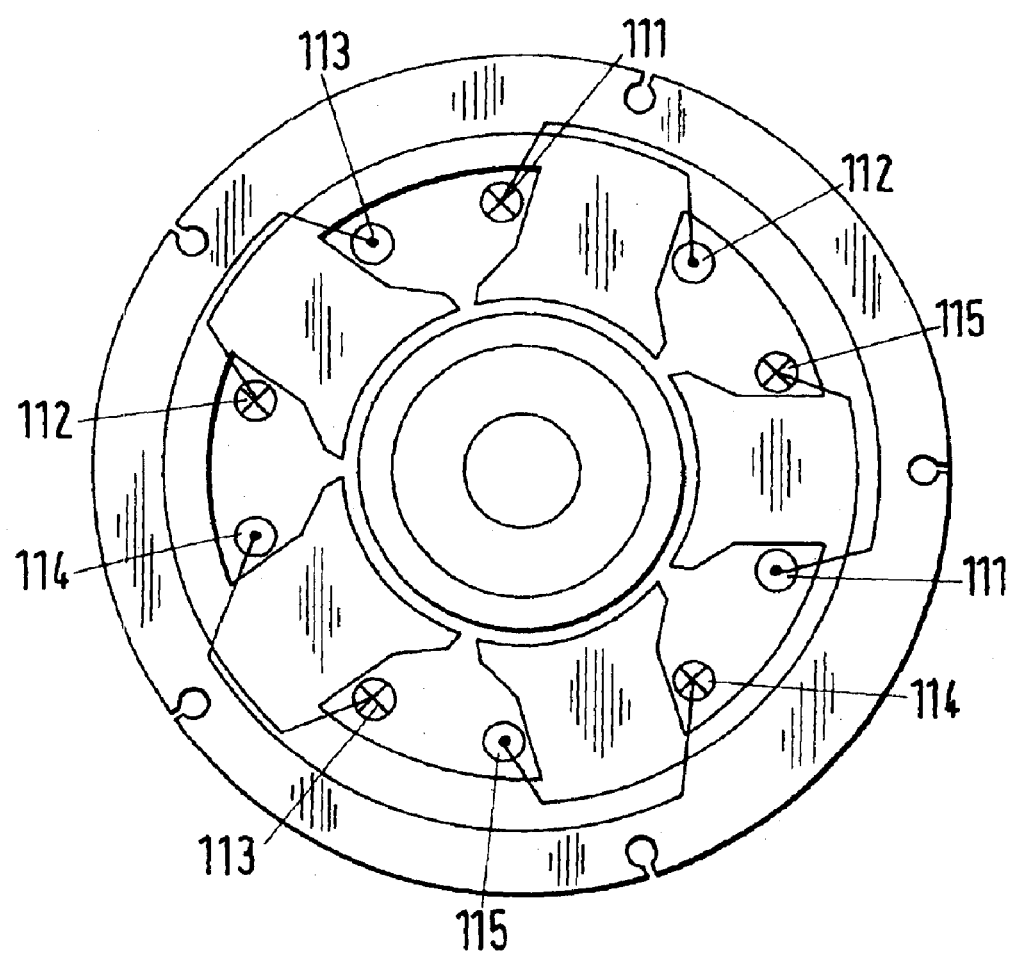
FIG. 11 shows a bearingless motor with distributed windings (individual coils)
Figure 12:
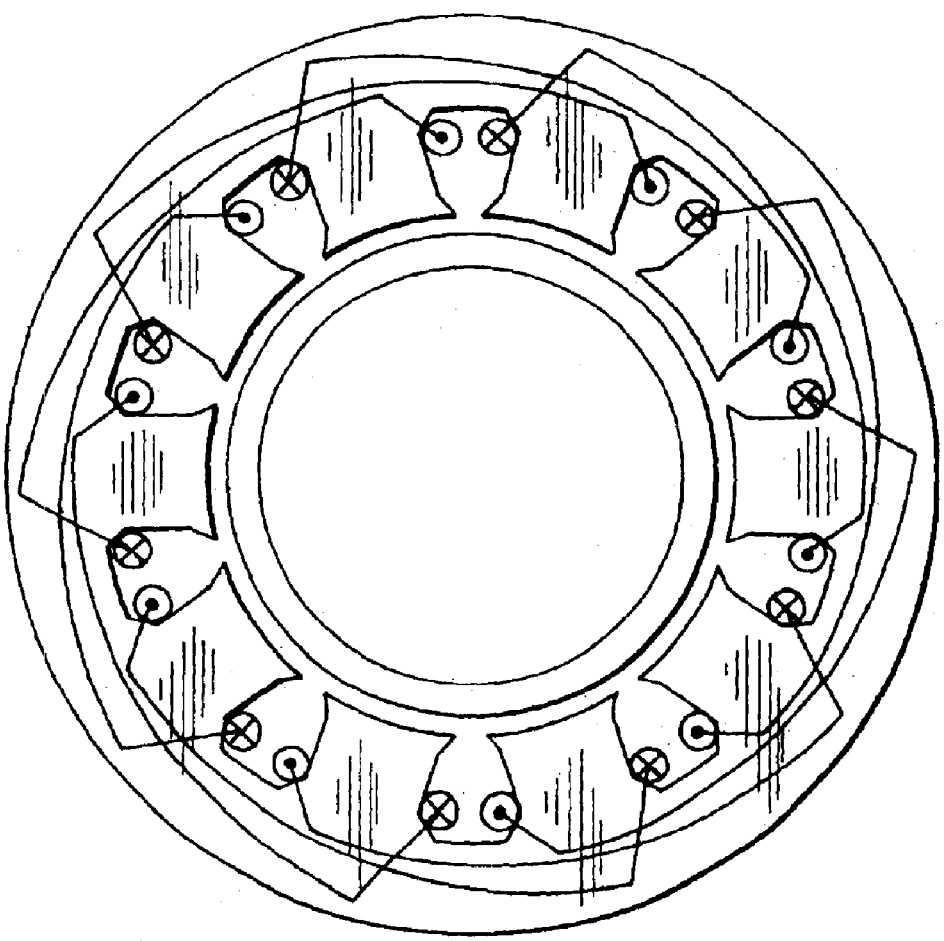
FIG. 12 shows a bearingless motor with distributed windings (coil groups)

An example to explain the principle construction is shown in FIG. 11. We see here five coils (111, 112, 113, 114 and 115) laid in slots with a greater coil width than in FIG. 4. The coils each surround two teeth and are thus no longer termed concentrated coils. A further variant is shown in FIG. 12 with an additional coil distribution, with two coils arranged in adjacent slots forming a coil group electrically connected together in series or parallel.

Figure 13:
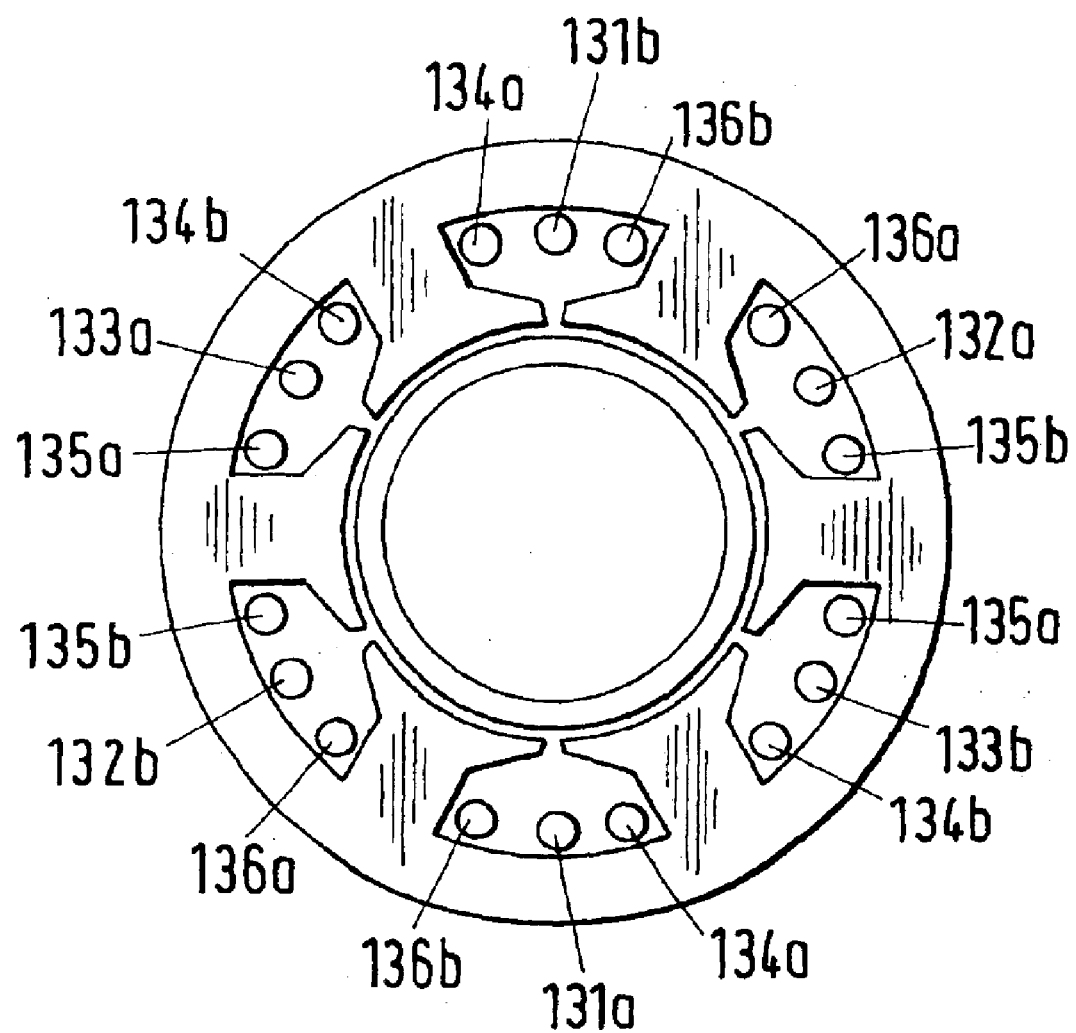
FIG. 13 shows a bearingless motor with separate winding sets for the generation of levitation force and torque.

Whereas the previously treated winding variants represent integrated variants which can simultaneously build up levitation forces and torques, FIG. 13 shows an embodiment with separate winding sets for the corresponding functions. The three-phase two-pole winding system 131a–131b, 132a–132b and 133a–133b serves with a two-pole permanent magnet excitation for the generation of torque. With the aid of the three-phase winding system 134a–134b, 135a–135b and 136a–136b a four-pole flux density distribution can be produced which can be used to generate levitation forces. The features of the invention can also be recognized in this variant.

Figure 14:
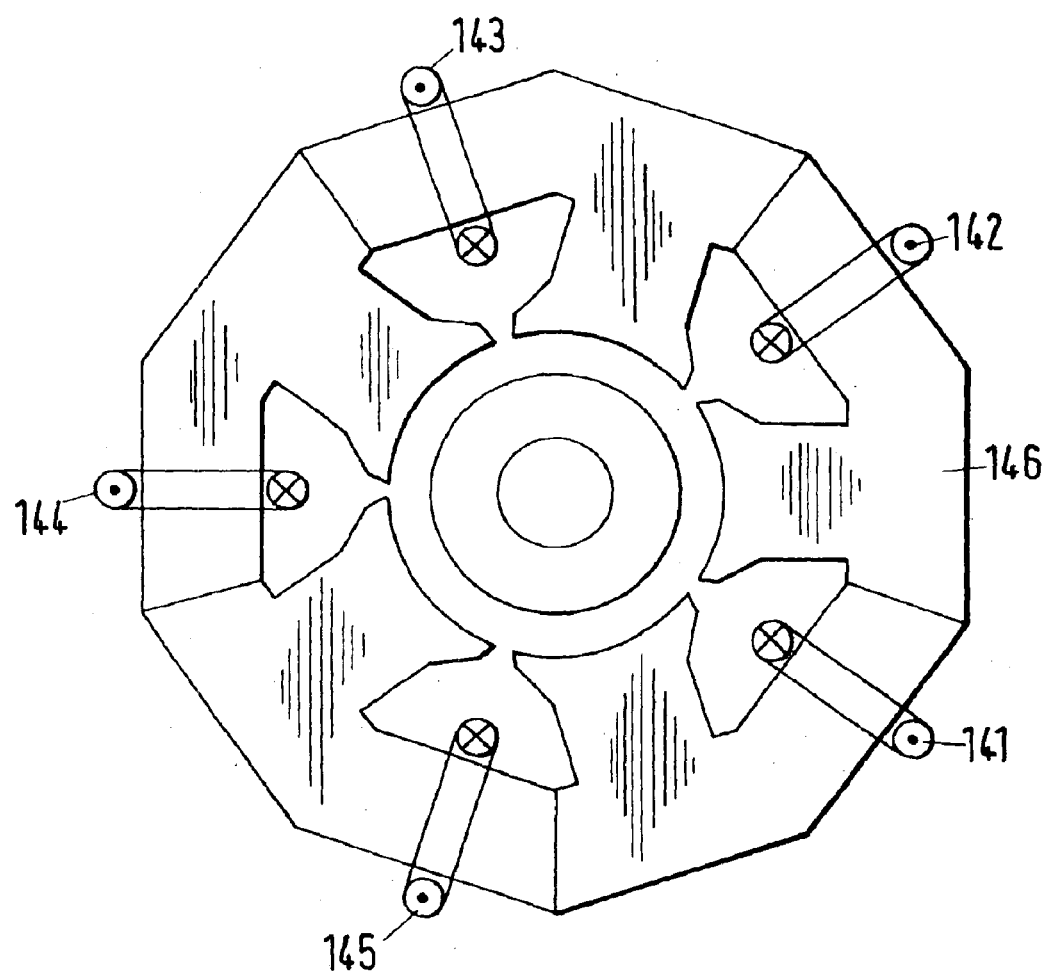
FIG. 14 shows a bearingless motor windings around the stator yoke.

A very simple and cost-favorable construction can be achieved by a mechanical arrangement such as is shown in FIG. 14. Here the coils (141, 142, 143, 144 and 145) surround the stator yoke (146) instead of the stator limb. If the stator yoke is assembled from segments, simple-shaped coils can be inserted. The individual segments can be installed and positioned via a segment carrier, such as for example a plastic part matched to the stator contour, via corresponding fastening means.

The variant shown in FIG. 14 offers the advantage that no parts (windings) projecting out of the stator teeth are located in the region of the stator teeth, close to the air gap. Accordingly, parts of pumps, blowers, fans, ventilators or others can be attached to the two surfaces of the stator depending on the application.

Figure 15:
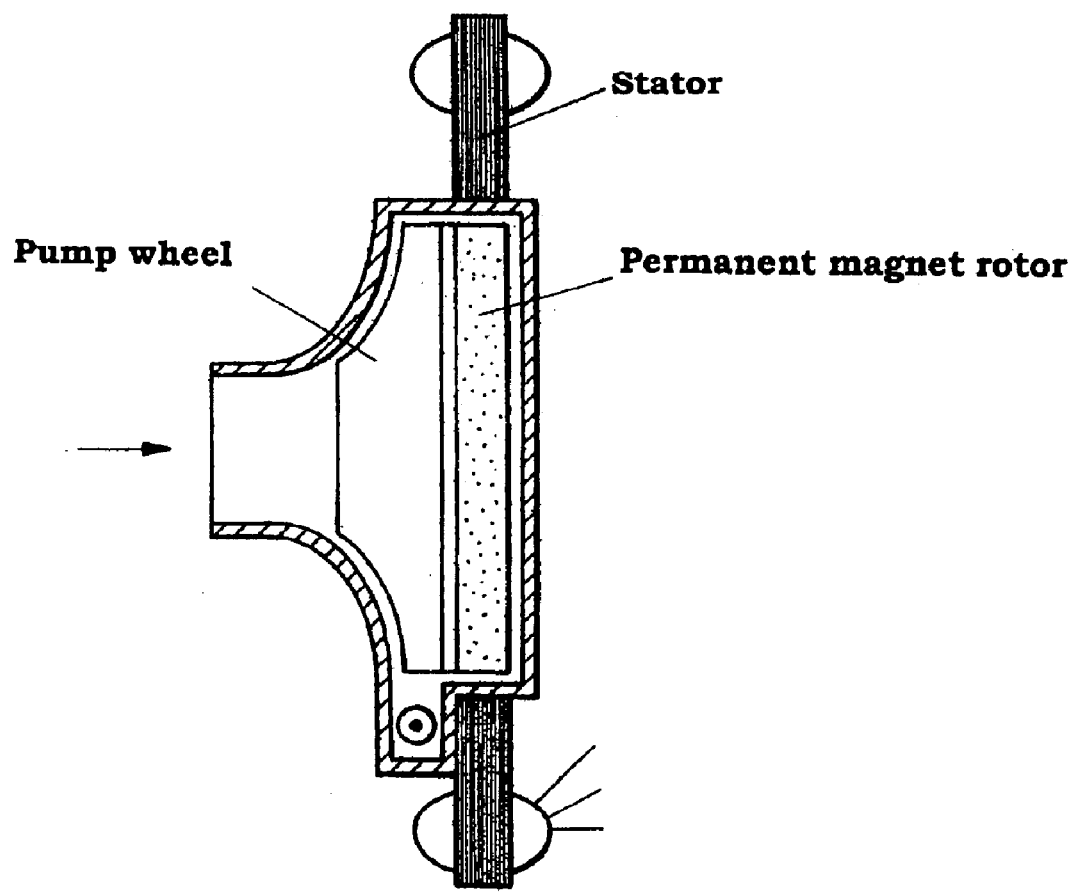
FIG. 15 schematically illustrates the present invention incorporate in a rotary pump.

In FIG. 15 an arrangement of this kind is shown. Here a part of the pump housing is directly located on the surface of the stator teeth.

What is claimed is:

1. Magnetically journalled electrical drive including a magnetically journalled electrical machine with windings inserted in the stator or rotor for the formation of torque and levitation force, a sensor system for determining the rotor positions and an analogue or digital electronic system for the control, regulation, monitoring and feeding of the magnetically journalled machine, with the electrical machine having windings which with appropriate current flow can produce magnetomotive forces (MMFs) or magnetic fields with the pole numbers $p_1$ and $p_2$ with $p_1$ and $p_2$ satisfying the condition $p_1=p_2\pm2$ and $p_1$ or $p_2$ representing the pole number of the rotor, characterized in that the electrical machine is equipped for the $p_1$ and $p_2$ pole field production or MMF production in the stator with a number n of stator limbs (with concentrated windings), stator teeth (with distributed windings) or stator slots, with the number n not simultaneously representing a whole-numbered multiple of the pole number $p_1$ and the pole number $p_2$.

2. Electrical drive in accordance with claim 1,
characterized in that stator segments between two axes through a stator middle point are distinguished in shape whereby the two axes stand orthogonal to one another.

3. Electrical drive in accordance with claim 1,
characterized in that a stator core is axially symmetrical to at most one of two axes in a stator plane which stand orthogonal to one another.

4. Electrical drive in accordance with claim 1,
characterized in that winding segments between two axes through a stator middle point are distinguished in shape whereby the two axes stand orthogonal to one another.

5. Electrical drive in accordance with claim 1,
characterized in that a winding arrangement is axially symmetrical to at most one of two axes in a stator plane standing orthogonal to one another.

6. Electrical drive in accordance with claim 1,
characterized in that at least one of the two $p_1$ and $p_2$ pole 1F or winding field distributions has asymmetries over the stator or air gap periphery within an interval of one or more pole pitches, or is composed of non-periodic sections.

7. Electrical drive in accordance with claim 1,
characterized in that the asymmetrical MMF distribution is in step-like form in accordance with the course of two superimposed $p_1$ and $p_2$ pole MMF functions, with at least one of these two functions having an angular step width of the stair steps which does not amount to any whole-numbered multiple of one or two pole pitches.

8. Electrical drive in accordance with claim 1,
characterized in that a stator winding is fully or partly designed as a distributed winding with coil groups which are composed of mutually displaced individual coils connected to one another.

9. Electrical drive in accordance with claim 1,
characterized in that a stator winding is fully or partly designed as a chorded winding, that is to say with coil widths dissimilar to one of the pole widths present in the motor.

10. Electrical drive in accordance with claim 1,
characterized in that a stator winding is assembled from concentrated coils which each surround one stator limb.

11. Electrical drive in accordance with claim 1,
characterized in that at least one limb or tooth which is not wound is located between two stator limbs wound with concentrated coils.

12. Electrical drive in accordance with claim 1,
characterized in that separate winding sets are used for the levitation force generation for the magnetic journaling and for the torque generation for the motor drive, with one winding set only being fed with currents for levitation force formation and the other winding set only being fed with currents for torque formation.

13. Electrical drive in accordance with claim 1,
characterized in that only one common winding set is used for the levitation force generation for the magnetic journaling and for the torque generation for the motor operation, with the coils of the winding set being operated with currents which contain both components for the generation of supporting forces and also components for the generation of the torque.

14. Electrical drive in accordance with claim 1,
characterized in that a winding set is so designed that with an appropriate current flow through winding phases with superimposed current components, a rotary field for the levitation force generation and a rotary field or alternating field for the torque formation can be produced simultaneously.

15. Electrical drive in accordance with claim 1,
characterized in that a winding set for the levitation force generation is designed as a rotary field winding.

16. Electrical drive in accordance with claim 1,
characterized in that a winding set for the torque formation is designed as a rotary field winding.

17. Electrical drive in accordance with claim 1,
characterized in that a winding set for the torque formation is designed as an alternating field winding.

18. Electrical drive in accordance with claim 1,
characterized in that coils enclose the stator yoke in a way that the coil axes essentially follow the circumferential direction or stand normal to rays through the center point of the stator in order to obtain space for mechanical or electrical assemblies, in particular for pump, compressor, fan or ventilator parts, in the region of the stator limbs and stator teeth close to the air gap.

19. Electrical drive in accordance with claim 1,
characterized in that a stator yoke is mechanically subdivided into individual separate sections m order to enable a simple assembly of the coils.

20. Electrical drive in accordance with claim 1,
characterized in that parts of the stator yoke are secured to a mounting carrier in such a way that as far as possible no considerable air gaps arise between the stator yoke parts.

21. Electrical drive in accordance with claim 1, characterized in that the motor has a two- or four-pole permanent magnet rotor and three, five, six or seven concentrated stator coils, with the coils being fed with currents which contain both components for the generation of levitation forces and also for the generation of torque.

22. Electrical drive in accordance with claim 1, characterized in that the motor has a plurality of phases which either consist of individual coils or of coils electrically connected together.

23. Electrical drive in accordance with claim 22 characterized in that the phases of the motor are star connected.

24. Electrical drive in accordance with claim 23, characterized in that with the motor phases star connected, the star-point is not electrically connected.

25. Electrical drive in accordance with claim 22 characterized in that the phases of the motor are connected in ring-like manner.

26. Electrical drive in accordance with claim 25, characterized in that the connected phase connections are driven via power half bridges.

27. Electrical drive in accordance with claim 25 characterized in that the connected phase connections are driven via power full bridges.

28. Electrical drive in accordance with claim 2, characterized in that the current distributions of the motor phases distributed at the stator periphery result in a stator MMF of the kind which, viewed over the periphery, contains a $p_1$ pole fundamental wave and a $p_2$ pole fundamental wave.

29. Electrical drive in accordance with claim 1, characterized in that the drive has a $p_1$ or $p_2$ pole rotor with permanent magnets.

30. Electrical drive in accordance with claim 1 wherein the rotor is a permanent magnet rotor.

31. Electrical drive in accordance with claim 18 wherein the space is for one of a pump, compressor, fan and ventilator parts.

32. Electrical drive in accordance with claim 22 wherein the coils are one of full pitch coils, chorded coils and distributed coils.

* * * * *